United States Patent [19]

Goepfert et al.

[11] Patent Number: 4,648,925

[45] Date of Patent: Mar. 10, 1987

[54] METHOD OF MAKING TRANSPARENT POLARIZING LAMINATED GLASSES

[75] Inventors: Serge P. P. Goepfert, Samoreau; Serge A. M. Renault, Montigny/Loing; Francoise M. M. Roger, Avon, all of France

[73] Assignee: Corning Glass Works, Corning, N.Y.

[21] Appl. No.: 717,829

[22] Filed: Mar. 29, 1985

[30] Foreign Application Priority Data

Aug. 1, 1984 [FR] France ................. 84 12192

[51] Int. Cl.$^4$ ................. B32B 31/00; C09J 5/02
[52] U.S. Cl. ................. 156/153; 156/100; 156/101; 156/103; 156/107; 156/281; 156/312; 156/314; 156/319; 156/324.4; 156/326; 156/329; 264/1.3; 350/320; 350/330; 350/398; 351/177; 428/1; 428/423.3
[58] Field of Search ................. 156/324.4, 100, 153, 156/103, 281, 107, 312, 146, 319, 314, 326, 329, 101; 428/1, 423.3; 351/177; 264/1.3; 350/320, 398, 330

[56] References Cited

U.S. PATENT DOCUMENTS

| 2,481,830 | 9/1949 | Dreyer | 350/398 |
| 2,544,659 | 3/1951 | Dreyer | 350/398 |
| 2,553,961 | 5/1951 | Dreyer | 156/100 |
| 4,154,638 | 5/1979 | Franz et al. | 156/326 |
| 4,261,656 | 4/1981 | Wu | 350/398 |

FOREIGN PATENT DOCUMENTS 1576394 10/1980 United Kingdom ............. 156/324.4

*Primary Examiner*—John J. Gallagher
*Attorney, Agent, or Firm*—C. S. Janes, Jr.

[57] ABSTRACT

This invention concerns an improved method for fabricating transparent laminated polarizing glasses consisting of a substrate of inorganic or organic glass, a coating of polarizing properties deposited upon one surface of the substrate, and an integral, optically transparent composite film consisting, on the one hand, of one lamina of thermoplastic polyurethane of adhesive properties, and, on the other hand, of one lamina of thermosetting polyurethane of anti-lacerative and self-regenerating properties; the thermoplastic polyurethane ply adhering to the polarizing coating. The method comprises applying the polarizing coating to the substrate, then treating at least the coated surface of the substrate with a aqueous solution containing γ-aminopropyltrimethoxysilane or γ-aminopropyltriethoxysilane, and thereafter applying said composite film.

6 Claims, No Drawings

METHOD OF MAKING TRANSPARENT POLARIZING LAMINATED GLASSES

BACKGROUND OF THE INVENTION

This invention concerns an improvement in the fabrication of transparent polarizing laminated glasses and the glasses obtained by this method.

U.S. application Ser. No. 446,551, filed Dec. 3, 1982 (based upon French Patent Application No. 8213076, published as No. 2,531,235), describes a transparent polarizing laminated glass comprised of:

(a) an inorganic or organic glass substrate;

(b) a coating with polarizing properties deposited on one of the surfaces of the substrate; and (c) a unitary composite film that is optically transparent which consists of a ply of thermoplastic polyurethane having adhesive properties and a ply of thermosetting polyurethane with tear resistant and self-regenerating properties, the thermoplastic polyurethane ply adhering to the coating having polarizing properties.

The substrate can be, among others, a glass with photochromic properties.

The polarizing coating can be formed of a mixture of three organic colorants corresponding to the three primary colors blue, red, and yellow and exhibiting a nematic state, said polarizing coating having a reduced water solubility as a result of an ion exchange treatment by an aqueous acid solution of inorganic salts.

In the composite film the thermoplastic polyurethane is formed from an aliphatic diisocyanate and a diol of an aliphatic diacidic polyester or a diol of a polyglycol ether, each one of said diols having a molecular weight of 500–4000, and the thermosetting polyurethane is the product of (a) a polyglycol ether resulting from the combination of 1,2-epoxypropane with 2,2-bis(hydroxymethyl)1-butanol and containing 10.5–12% by weight of free hydroxyls, and (b) a biuret of 1,6-hexamethylene diisocyanate containing 21–22% by weight of isocyanate groups, the weight of said biuret being 0.9–1.1 times the weight of said polyglycol ether, the thermoplastic polyurethane ply ranging from 0.01–0.8 mm and the thermosetting polyurethane ply ranging from 0.2–0.8 mm.

If desired, the composite film may be subjected to a coloring treatment.

In the above-mentioned patent application there is also described a process for fabricating this transparent polarizing laminated glass which comprehends the following steps:

(a) forming parallel microgrooves on the inorganic or organic substrate which is to receive the polarizing coating by means of a very slightly abrasive brushing of said substrate;

(b) carefully washing the surface of the substrate that is to receive the polarizing coating and drying this surface;

(c) depositing on the washed and dried surface of the substrate a mixture of three organic colorants corresponding to the three primary colors and exhibiting a nematic state;

(d) treating the resulting polarizing coating by immersing in an aqueous solution of inorganic salts having an acid pH in order to reduce the water solubility of said polarizing coating; and (e) applying the composite polyurethane film by first subjecting it to conditions of moderate temperature and pressure in order to insure a gradual and crease-free spreading out and adherence of the film to the polarizing coating, and then to conditions of high temperature and pressure in order to reinforce the mechanical bond between the film and the coating and to achieve cross linking of the composite film.

In certain applications, particularly when the laminated glass is a glass blank for eyeglasses which is subjected to an operation known as "edging" (finishing of the outside in order to form the glass to the shape of the frame in which it is to be mounted), it is advisable to carry out an additional step consisting of applying, after drying, a resin polymerizable by ultraviolet radiation to the cross section of the laminated glass, thereafter exposing the resin layer to ultraviolet rays to cause the resin to harden, this being done in order to prevent moisture from infiltrating into the laminated glass and to bring about in the end the destruction of the polarizing layer by delamination, particularly at the polarizing coating-glass substrate interface, since the edging operation, in effect, has the disadvantage of breaking through the thin stabilizing layer formed on the polarizing coating at the level of the cross section of the glass.

The above-discussed previous process has certain deficiencies:

The level of adhesion between the polarizing coating and the glass substrate is relatively weak such as to produce, during edging, separations that involve the rejection of a rather high percentage of edged laminated glasses and, therefore, increased cost.

The layer of polymerizable resin applied to the cross section of the laminated glass after edging imparts, after polymerization, only a mediocre aesthetic appearance to the finished laminated glass. In addition, the operation of applying this layer of resin is rather tedious and adds to the complexity of the former process.

Therefore, it would be very advantageous to devise an improved process to permit simplification of the entire fabrication process, to reduce the cost of fabrication, and to improve the reliability of the final product.

SUMMARY OF THE INVENTION

The objective of the invention is to provide an improved process which makes it possible to reinforce the strength of the bond between the polarizing coating and the glass substrate while also subsequently reinforcing the strength of the bond between the polarizing coating and the composite polyurethane film, thereby permitting improved edging conditions, and also to dispense with having to apply a resin layer to the cross section of the laminated glass.

The improved process of the invention is based upon a treatment of the entire substrate-polarizing coating structure having reduced water solubility obtained after Step (d) of the prior process by certain specific gamma-aminoalkyl alkoxysilanes under particular conditions.

The utilization of γ-aminoalkyl alkoxysilanes as coupling agents to reinforce the mutual adhesion of different materials, for example, of an organic polymer and an inorganic glass or of two different organic polymer materials, is well known; see for example, the article in the journal *Midland Macromolecular Monographs*, Volume 7, by D. E. Leyden and W. T. Collins. However, it was not known that certain coupling agents of this type can be used under the conditions described above to reinforce the adherence of materials lacking in affinity and sensitive to factors such as pH, moisture, and temperature, while providing a laminated article of very high optical quality.

More particularly, the invention concerns an improved process for manufacturing transparent polarizing laminated glasses which comprises the following steps:

(a) forming parallel microgrooves on the inorganic or organic glass substrate that is to receive the polarizing coating by means of a very light abrasive brushing of said substrate;

(b) carefully washing the substrate that is to receive the polarizing coating and drying this surface;

(c) depositing on the washed and dried surface of the substrate a mixture of three organic colorants corresponding to the three primary colors and exhibiting a nematic state;

(d) treating the resulting polarizing coating by immersing into an aqueous solution of inorganic salts at an acid pH in order to reduce the water solubility of said polarizing coating; and (e) applying a composite polyurethane film by first subjecting it to moderate conditions of temperature and pressure in order to insure a gradual and crease-free application and adhesion of the film to the polarizing coating, and then to elevated temperature and pressure conditions in order to reinforce the mechanical bond between the film and the coating and to achieve cross linking of the composite film;

characterized in that the process comprehends an additional step consisting of placing the product ressulting from Step (d) above into contact with an aqueous solution prepared from at least one compound selected from γ-aminopropyltrimethoxysilane and γ-aminopropyltriethoxysilane, the silane representing 0.1-10% by volume of the solution and the aqueous solution has a pH ranging from about 10-11.2.

Steps (a), (b), (c), (d), and (e) of the process are carried out according to the above-mentioned patent application, the disclosure of which is incorporated here by reference.

The operable silanes are γ-aminopropyltriethoxysilane having the formula $H_2N(CH_2)_3Si(OC_2H_5)_3$, abbreviated γ-APTES, and γ-aminopropyltrimethoxysilane having the formula $H_2N(CH_2)_3Si(OCH_3)_3$, abbreviated γ-APTMES. For reasons of commercial availability and the quality of the polarizing laminated glasses obtained, γ-APTES is now preferred. Mixtures of the two silanes can be utilized, if desired.

DESCRIPTION OF PREFERRED EMBODIMENTS

The preparation of the aqueous solution proceeds by mixing the silane and water, possibly adjusting the pH within the indicated range by adding an acid, for example, acetic acid, and then leaving the entire mixture to react for a sufficient length of time (for example, 3-6 days) so that the alkoxy groups of the silane are hydrolyzed into silanol groups. After deposit onto the polarizing coating, these silanol groups then give rise to a condensation reaction with the formation of —Si—O—Si— bonds. The hydrolysis ought to be as thorough as possible, but it is generally not total. Concurrently with this hydrolysis, there is produced a quaternization of the amino groups which ought to be as complete as possible because it has been observed that, in the contrary case, the amino group of the silane can react in the presence of moisture with the constituents of the polarizing coating, which are very sensitive to local variations of pH and could cause redhibitory coloration of said polarizing coating. It is to be noted that the organic solvents or co-solvents normally recommended for use with γ-aminoalkyhalkoxysilanes, such as cyclohexane, toluene, isopropanol, and acetone are proscribed for reasons of mutual incompatibility with the different materials in the final laminated glass, in particular the polyurethanes of the composite film applied later.

The silane solution utilized in Step (d) is characterized, among other things, by its pH which is in fact related to the amount of γ-silane introduced in solution into the water.

The best results with regard to the holding of the finished laminated glass immersed in water without degradation of the transmission and polarizing properties, and the capability of edging the laminated glass without having to perform a preliminary heat treatment at 110° C.±10° C. are obtained with an aqueous solution of basic silane having a pH ranging between 10-11.2, as illustrated in Table No. 1 (Examples Nos. 1, 2, and 11). These solutions correspond to a concentration ranging between 0.1-10% by volume with regard to the total volume of water+silane. Nevertheless, it is to be noted that the concentrations of silane less than 1% by volume are rather difficult to control on an industrial scale and, for that reason, it is preferred to use a concentration of 1-10%.

Above a pH of 11.2, corresponding to silane concentrations greater than 10%, the polarizing coating is completely destroyed or very largely altered during the silylation operation, as is illustrated in Table No. 1, Example No. 3. Below a pH of 10, which is obtained by reducing the silane concentration below 0.1% or through the addition of a small quantity of acid, for example, acetic acid in a solution of satisfactory concentration, the polarizing coating acquires a milky appearance and, furthermore, the adhesion of the polyurethane film is altered, which, as a consequence, confers to the final product an unacceptable resistance to water immersion, as is shown in Table 1, comparative Example No. 4.

The sought for effects of improved adherence of the polyurethane film and of moisture resistance of the laminated glass are also related to the temperature of aqueous silane bath and to the duration of the immersion treatment.

The temperature of treatment by the silane solution must not exceed about 30° C. because for treatment temperatures greater than 30° C. the desired effect begins to be modified, the alteration increasing gradually with the temperature and the duration of the treatment by the silane, as shown in Table No. 1, Examples 5 and 6.

On the other hand, at a temperature less than 30° C., for example, at 20°-25° C., under optimum conditions of pH and concentration defined above, the duration of the treatment has no practical effect upon the level of adhesion of the polyurethane film or upon the moisture resistance of the final product which retains its optical properties, as shown in Table No. 1, Examples Nos. 2, 7, and 8. As a guideline, treatment times on the order of 2-60 minutes, preferably 2-10 minutes, have been found satisfactory.

After the silane treatment, the treated product obtained is subjected to an intensive rinsing; for example, first using tap water and then finally with distilled water, the purpose of which is to eliminate calcareous traces which might appear during subsequent drying. The objective of these rinsing operations is to eliminate excess silane and thereby permit only the necessary amount of active silane to remain. Too intensive rinsing must be avoided because it may alter the polarizing coating. Thus, it has been found experimentally that to prolong the rinsing operation beyond 60 minutes at ambient temperature (Example No. 10, Table 1) or beyond 2 minutes at 80° C. (Example No. 9, Table 1) causes alterations in tint and in the polarizing effect of the organic polarizing coating.

After rinsing, the product is subjected to a dual-purpose heat treatment. On the one hand, this treatment is designed to fix onto the polarizing coating the functional groups of the reaction product of the water and silane deposited onto the treated product. On the other hand, this treatment is designed to cause indispensable polymerization of the silane molecules condensed on the surface.

It has been found that a treatment at 80°–140° C. for about 15 minutes to 1 hour, preferably 125°–135° C. for 30–45 minutes, gives satisfactory results. Times that are too long and temperatures too high tend to cause a very slight degradation of the polarizing coating, whereas times that are too short and/or temperatures that are too low have a tendency to decrease the subsequent adherence of the composite polyurethane film.

After the heat treatment, one proceeds to apply the composite polyurethane film [Step (e)], as described in the prior application.

After Step (e) the resulting laminated glass may be subjected, if desired, to an edging operation without any particular precaution, that is to say, without having to make a preliminary heat treatment at 110° C.±10° C., which treatment was designed to temporarily increase the adherence of the polarizing coating to the composite film.

After edging, it is no longer necessary to apply to the cross section of the edged laminated glass in order to physically protect the polarizing coating against possible infiltration of water, a thin layer of polymerizable organic resin. This represents an important progress because this operation, in addition to conferring an aesthetically mediocre appearance to the final product, demanded much time and manpower experimentation since it was not easily automated.

The finished glass obtained can then be mounted in eyeglasses without any precaution and without fear of deterioration as shown by tests for more than 252 hours at 50° C. and 98% relative humidity in a climate controlled chamber, followed by prolonged immersion for several weeks in fresh water and in sea water.

These results can be obtained on the condition that the treatment of the present invention is conducted correctly, that is to say, that the silylation is effected correctly. This point can be completely verified through an optical analysis via infrared reflection at low and variable reflectance permitting the obtaining of a good specular component, and through the observation of the presence of characteristic absorption peaks visible at wavelengths of 900–1000 $cm^{-1}$, as described in detail by S. Naviroj et al. in the article "Diffuse Reflectance Fournier Transform Infrared Spectroscopic Study of Chemical Bonding and Hydrothermal Stability of an Aminosilane on Metal Oxide Surfaces" in *Progress in Sciences and Engineering of Composites*, 1982, pages 227–234.

The laminated glasses of the invention exhibit polarizing effects ranging between 50–98% and optical transmissions below 2 mm ranging between $25 \geq 45\%$ as a function of the amounts of the polarizing properties, their organization, and of the dichroic effect. These products conform completely to all of the standards in effect in the field of eyeglass manufacturing.

It is convenient to note, among other things, that the laminated glasses of the invention can be colored, if desired, according to the process described in U.S. Pat. No. 4,454,170. One thus has the possibility of easily producing the desired products, namely, easily tintable polarizing photochromic glasses able to cut off ultraviolet radiation and having forms and curvatures of the most variations without any restrictions.

Finally, although the present application makes the most special reference to a laminated glass designed for the eyeglass industry, this application is not so limited. In effect, application for this glass can certainly be found in other fields, for example, as windows for vehicles (automobiles, boats, and trucks) or for buildings, as windows for digital display readouts used in electronics, instrumentation, or clockmaking under the name "liquid crystal display", or as lenses for optical instruments such as pattern projectors. In general, the invention is useful in all areas where polarization of the incident or reflective light is able to provide comfort or technical possibilities to the users.

Table 1 below summarizes different tests made under various conditions and indicates the results obtained. In Examples 1–11 the silane used was γ-APTES. In Example 12 the silane used was γ-APTMES.

TABLE No. 1

TREATMENT PARAMETERS AND CHARACTERISTICS OF PRODUCTS OBTAINED BY USE OF SAID TREATMENT AND OF THE VARIANTS THEREOF

| Characterizing parameters | 0 (control) | 1 | 2 | 3 | 4 |
|---|---|---|---|---|---|
| Characterization of treatment | | | | | |
| Silane concentration | 0 | 2% | 10% | 50% | 10% |
| pH of solution | — | 10.7 | 11.2 | 11.5 | 4 |
| Temperature and time of treatment bath | — | 25° C. 2 mm | 25° C./2 min | 25° C./2 min | 50° C./15 min |
| Temperature and time of rinsing bath | — | 25° C. 2 mm | 25° C./2 min | | 25° C./2 min |
| Characterization of product obtained | | | | | |
| Optical transmission | 38% | 38% | 38% | Polarizing coating destroyed from this Treatment | 38% |
| Polarizing effect | 89% | 89% | 89% | Polarizing coating destroyed from this treatment | 89% |
| Total immersion resistance of laminated glass | 1 hr | >3 weeks | >3 weeks | Polarizing coating destroyed from this treatment | 1 hr |

TABLE No. 1-continued
TREATMENT PARAMETERS AND CHARACTERISTICS OF PRODUCTS OBTAINED BY USE OF SAID TREATMENT AND OF THE VARIANTS THEREOF

| | | | | | |
|---|---|---|---|---|---|
| Adherence of polyurethane film | 6N/cm | 15N/cm | 14N/cm | Polarizing coating destroyed coating destroyed from this treatment | 10N/cm |
| Comments | Basic product | Correct color | Correct color | Polarizing coating destroyed from this treatment | Milky appearance |

| | Test Number | | | | |
|---|---|---|---|---|---|
| Characterizing parameters | 5 | 6 | 7 | 8 | 9 |
| Characterization of treatment | | | | | |
| Silane concentration | 10% | 10% | 10% | 10% | 2% |
| pH of solution | 11.2 | 11.2 | 11.2 | 11.2 | 10.7 |
| Temperature and time of treatment bath | 50° C./15 min | 80° C./2 min | 25° C./15 min | 25° C./120 min | 25° C./2 min |
| Temperature and time of rinsing bath | 25° C./2 min | — | 25° C./2 min | 25° C./2 min | 80° C./2 min |
| Characterization of product obtained | | | | | |
| Optical transmission | 45% | Polarizing coating destroyed from this treatment | 38% | 39% | 40% |
| Polarizing effect | 69% | Polarizing coating destroyed from this treatment | 89% | 88% | 86% |
| Total immersion resistance of laminated glass | >3 weeks | Polarizing coating destroyed from this treatment | >3 weeks | >3 weeks | >3 weeks |
| Adherence of polyurethane film | 16N/cm | Polarizing coating from this treatment | 15N/cm | 15N/cm | 15N/cm |
| Comments | Yellowish tint | Polarizing coating destroyed from this treatment | Correct color | Correct color | Slightly green |

| | Test Number | | |
|---|---|---|---|
| Characterizing parameters | 10 | 11 | 12 |
| Characterization of treatment | | | |
| Silane concentration | 10% | 0.1% | 10% |
| pH of solution | 11.2 | 10.5 | 11 |
| Temperature and time of treatment bath | 25° C./2 min | 25° C./15 min | 25° C./15 min |
| Temperature and time of rinsing bath | 25° C./60 min | 25° C./2 min | 25° C./2 min |
| Characterization of product obtained | | | |
| Optical transmission | 38% | 40% | 39% |
| Polarizing effect | 84% | 89% | 88% |
| Total immersion resistance of laminated glass | >3 weeks | 1 hr | 3 weeks |
| Adherence of polyurethane film | 15N/cm | 8N/cm | 17N/cm |
| Comments | Slightly green | Correct color | Correct color |

We claim:

1. A process for fabricating a transparent polarizing laminated glass comprising an inorganic or organic substrate, a coating of polarizing properties deposited upon one surface of the substrate, and a one piece, optically transparent composite film consisting, on the one hand, of a layer of thermoplastic polyurethane with adhesive properties and, on the other hand, of a layer of thermosetting polyurethane with anti-lacerative and self-regenerative properties, the thermoplastic polyurethane layer adhering to the coating with polarizing properties, this process comprehending the following steps:

(a) forming parallel microgrooves on the inorganic or organic glass substrate that is to receive the polarizing coating by means of a very slightly abrasive brushing of said substrate;

(b) carefully washing the substrate surface that is to receive the polarizing coating and drying this surface;

(c) depositing on the washed and dried surface of the substrate a mixture of three organic colorants corresponding to the three primary colors and having a nematic state;

(d) treating the resulting polarizing coating by immersing into an aqueous solution of inorganic salts at an acid pH in order to reduce the water solubility of said polarizing coating;

(e) contacting the resulting product at a temperature not to exceed 30° C. with an aqueous solution prepared from at least one compound selected from the group of γ-aminopropyltrimethoxysilane and γ-aminopropyltriethoxysilane, the silane representing 0.1-10% by volume of the solution and the aqueous solution having a pH ranging between 10-11.2;

(f) rinsing the resulting product to eliminate excess silane;

(g) heat treating the rinsed product at about 80°-140° C. for about 15-60 minutes; and (h) applying the composite polyurethane film by first subjecting it to conditions of moderate temperature and pressure in order to insure a crease-free and gradual spreading out and adherence of the film to the polarizing coating, and thereafter to conditions of elevated temperature and pressure to reinforce the mechanical bond between the film and the coating and to achieve crosslinking of the composite film.

2. A process according to claim 1 wherein the silane represents 1-10% by volume of the aqueous solution of Step (e).

3. A process according to claim 1 wherein the silane is γ-aminopropyltriethoxysilane.

4. A process according to claim 1 wherein the aqueous solution of Step (e) is prepared by reacting the silane and water for a period of about 3-6 days at ambient temperature.

5. A method according to claim 1 wherein said product of Step (d) is placed into contact with said aqueous solution of Step (e) for a time of about 2-60 minutes.

6. A method according to claim 1 wherein said heat treatment is carried out at 125°-135° C. for 30-45 minutes.

* * * * *

UNITED STATES PATENT AND TRADEMARK OFFICE
CERTIFICATE OF CORRECTION

PATENT NO. : 4,648,925
DATED : March 10, 1987
INVENTOR(S) : Serge P. P. Goepfert et al.

It is certified that error appears in the above-identified patent and that said Letters Patent is hereby corrected as shown below:

Column 3, line 30, "ressulting" should read --resulting--.

Column 6, line 20, "25$\geq$45%" should read --25-45%--.

Column 5, Table No. 1 (under Test Number 1), line 11, "2 mm" should read --2 min--.

Column 5, Table No. 1, (under Test Number 1), line 13, "2 mm" should read --2 min--.

Columns 7 and 8, fifth column under Table No. 1-continued, line 6, delete "coating destroyed".

Columns 7 and 8, third column under Table No. 1-continued, line 21, delete "destroyed".

Columns 7 and 8, third column under Table No. 1-continued, line 27, after "Polarizing coating" insert --destroyed--.

Signed and Sealed this

Eighth Day of March, 1988

Attest:

DONALD J. QUIGG

Attesting Officer

Commissioner of Patents and Trademarks